US 8,584,236 B2

(12) United States Patent
El-Moussa et al.

(10) Patent No.: US 8,584,236 B2
(45) Date of Patent: Nov. 12, 2013

(54) METHOD AND APPARATUS FOR DETECTING ABNORMAL TRAFFIC IN A NETWORK

(75) Inventors: Fadi El-Moussa, Suffolk (GB); Hui Min June Tay, Suffolk (GB)

(73) Assignee: British Telecommunications public limited company, London (GB)

( * ) Notice: Subject to any disclaimer, the term of this patent is extended or adjusted under 35 U.S.C. 154(b) by 777 days.

(21) Appl. No.: 12/593,370

(22) PCT Filed: Mar. 7, 2008

(86) PCT No.: PCT/GB2008/000785
§ 371 (c)(1),
(2), (4) Date: Sep. 28, 2009

(87) PCT Pub. No.: WO2008/117012
PCT Pub. Date: Oct. 2, 2008

(65) Prior Publication Data
US 2010/0122342 A1    May 13, 2010

(30) Foreign Application Priority Data

Mar. 28, 2007   (EP) .................................... 07251314
Nov. 16, 2007   (EP) .................................... 07254495

(51) Int. Cl.
*G06F 7/04*      (2006.01)
*H04L 1/24*      (2006.01)

(52) U.S. Cl.
USPC .......................................................... 726/23

(58) Field of Classification Search
None
See application file for complete search history.

(56) References Cited

U.S. PATENT DOCUMENTS

| 2003/0172289 | A1* | 9/2003 | Soppera ......................... 713/200 |
| 2004/0098618 | A1  | 5/2004 | Kim et al. |
| 2005/0278779 | A1  | 12/2005 | Koppol et al. |
| 2006/0107318 | A1* | 5/2006 | Jeffries et al. .................... 726/22 |
| 2006/0156402 | A1* | 7/2006 | Stone et al. ...................... 726/22 |
| 2007/0033645 | A1* | 2/2007 | Jones .............................. 726/12 |
| 2007/0079367 | A1* | 4/2007 | Ishikawa ......................... 726/13 |

FOREIGN PATENT DOCUMENTS

| WO | WO 2006/004556 | 1/2006 |
| WO | WO 2011/061509 | 5/2011 |

OTHER PUBLICATIONS

International Search Report for PCT/GB2008/000785 mailed May 8, 2008.
Yu Chen et al., "MAFIC: Adaptive Pocket Dropping for Cutting Malicious Flows to Push Back DDos Attacks", *Distributed Computing Systems Workshops*, Jun. 2005, pp. 123-129, XP010808046.
Xin Hu et al., "RB-Seeker: Auto-Detection of Redirection Botnets," Jul. 11, 2009, XP002587668, pp. 1-17.
Peter Wurzinger et al., "Automatically Generating Models for Botnet Detection," Sep. 21, 2009, Computer Security Â Esorics 2009, XP019129284, pp. 232-249.

* cited by examiner

Primary Examiner — Venkat Perungavoor
(74) *Attorney, Agent, or Firm* — Nixon & Vanderhye P.C.

(57) ABSTRACT

A method of identifying traffic within a network representative of an abnormal network condition, including: monitoring a communications link for a high traffic volume level; identifying a domain being the source of the high traffic volume level; identifying within the domain, a sending entity transmitting traffic from the domain; using a detector located at or proximate to the domain to invoke a response from the sending entity; wherein a failure by the sending entity to provide an expected response to the message in accordance with a network protocol indicates that the traffic transmitted by the sending entity is traffic representative of an abnormal network condition.

21 Claims, 5 Drawing Sheets

METHOD AND APPARATUS FOR DETECTING ABNORMAL TRAFFIC IN A NETWORK

This application is the U.S. national phase of International Application No. PCT/GB2008/000785 filed 7 Mar. 2008 which designated the U.S. and claims priority to European Patent Application Nos. 07251314.6 filed 28 Mar. 2007 and 07254495.0 filed 16 Nov. 2007, the entire contents of each of which are hereby incorporated by reference.

The present invention relates to methods, apparatus and installations related to the detection of senders of high volumes of traffic over a communications link or network. It is concerned particularly, but not exclusively, to denial of service (DoS) attacks by way of flooding the network (or part thereof) with traffic directed to one or more target or victim receivers.

DoS attacks can be characterised chiefly by the intention of the attacker to disrupt the operation of the victim, by starving it of computer resources or preventing other legitimate users from reaching the victim's servers by depleting its resources (such as bandwidth, CPU cycles, memory). DoS attacks have an enormous adverse impact on businesses in particular. Recent studies and figures suggest that such attacks are becoming even more prevalent than fast-spreading worms or DNS poisoning, primarily due to the ease of implementation, availability of resources, and difficulty of identification of the attacker, whose profile could range from a single individual seeking peer group recognition, or else is unhappy with an organisation, to a group with commercial or cyber-terrorist aims.

Many DoS attack modes over the Internet and such communications systems exploit characteristics and limitations in transmission and routing rules and protocols which govern the delivery of packets over a network. As is well known, these transmission protocols in the network and transport layers include the Internet Protocol (IP), the Internet Control Message Protocol (ICMP) the Transport Control Protocol/Internet Protocol (TCP/IP) and the User Datagram Protocol (UDP).

TCP is a connection-oriented protocol which enables two hosts to establish a connection to exchange in-sequence data in a reliable manner. This reliability stems in part from the receiver's acknowledging the receipt of packets received in the correct sequence number order, usually by way of an acknowledgment (ACK) packet or message. Furthermore, if an expected packet is not received at the receiver or far end within a reasonable round-trip time, a timer will cause a timeout wherein the expected packet is deemed to be missing. Whenever an expected packet is not received, this will be transmitted by the sending end.

In contrast, UDP is a connectionless transport protocol, which transmits traffic in an unreliable manner over the network. As is known, UDP transmits segments including source and destination ports which define end points within the source and destination machines, which allow for the correct delivery of the segments. No connection setup is required for a UDP transmission, making this protocol a preferred choice for DoS attackers.

While TCP and UDP are transport layer protocols, the ICMP functions at the network layer and serves to flag up unusual events and errors in the processing of datagrams within the Internet.

The typical DoS attack mode is to flood the receiver with so much traffic that the victim's resources are consumed in dealing with the maliciously-sent traffic, and there is none left for the receiver's own legitimate functions, causing the receiver's system to operate at a reduced speed or worse, to hang or crash. Network equipment can be overwhelmed in an attack even before the traffic reaches its intended victim, as routers, servers, firewalls and so on would have capacity, memory and other limits which may be stressed by the speed and/or volume of the attack transmission. The flooding traffic can take the form of the use of a high packet rate, the sending of many small packets, and the like. Known variations of flooding attack techniques include SYN floods, ICMP floods, UDP floods and the like, each of which have their own characteristics, but in all cases they involve sending a large amount of data, typically at a high speed, to the victim.

One example of a weakness in the TCP protocol which attackers take advantage of is a SYN flood. Here, a number of connection requests are sent to the victim's computer. The victim's response granting the request is then ignored, leaving the victim with dead connections reserved for clients who will never respond. This occupies much or all of the victim's resources, preventing legitimate users from connecting to the victim. In a UDP flood, an attacker sends a stream of traffic to a random port on the victim's machine, requiring the victim to allocate resources to process the received packet. When it is realised that no application is waiting on the port, an ICMP Destination Unreachable message has to be sent to an often-forged source address. In the flood of traffic, the victim's resources can be rapidly consumed.

Attacks can be performed either by a single malicious sender, or can be the concerted action of a number of machines in what is known as a Distributed Denial of Service (DDoS) attack (which is included in references herein to the term "DoS attacks"). In the latter case, the concerted action can be controlled by a single, master machine which controls the action of a network "zombies" being computers including a daemon which the master machine uses to launch a flooding DoS attack, or "bots" being client computer programs running in the background which can be controlled by a remote master computer to automatically launch a flooding attack. These sending entities may be hosted on an infected or compromised machine used by a user who is innocent of the malicious flooding traffic emanating from his computer. (In this description, the term "sender" shall include such sending entities.) In such cases, the identity of the sender and/or master computer is also concealed. In yet another variation, the attacker uses the victim's address and sends out spoof messages, so that replies to the spoof message will flood the victim's machines.

Upon experiencing the effects a DoS attack (e.g. slowing down of services, hanging or crashing), the victim will typically inform its network administrator or Internet service provider (ISP). Alternatively, a DoS attack can be identified using anomaly- and/or signature-detection techniques which are briefly discussed below. The ISP will then identify the domain from which the attacking packets are originating by examining the source address in the IP packet header, and inform the ISP of that domain (the "attacker's domain" or "sender's domain") of the problem and the identity of the victim. The ISP of the attacker's domain will investigate, and block traffic that is addressed and being transmitted to the victim from the attacker's domain.

One relatively crude response to the identification of DoS attack traffic is to simply shut down the communications link to the victim and block all traffic bound therefor from the sender's domain. The network administrator will block all traffic originating from the infected machine, even if the user is legitimately connected to the victim's website, or even another (legitimate) website.

A less drastic, commonly-deployed response is "rate limiting", in which the transmission rate of the victim's communication link is reduced by a certain arbitrary percentage. In such cases, legitimate parties seeking to communicate with the victim are also blocked off, which may include legitimate parties whose Computers are infected with bots and/or zombies which are, unbeknownst to the legitimate host party, responsible for the DoS flooding attack. Because legitimate packets cannot be distinguished from attacking packets, both are let through. In a DoS flood, most of the traffic getting through to the victim's machine will be attacking and not legitimate traffic.

Various techniques to identify a DoS attack have been proposed. For example in US 2006/0161980, it is assumed that attacking packets will not have valid packet header parameters, and that this can be checked by finding matches in the TCP stack at the receiver host. However, attackers can use "legitimate" traffic to launch DoS flooding attacks, e.g. by maliciously resending the one legitimate packet a number of times.

Other techniques for recognising or identifying a DoS traffic flood include anomaly and pattern detection. In anomaly detection, as described in Maselli et al., "Design and Implementation of an Anomaly Detection System: an Empirical Approach", profiles of all allowed application behaviour and traffic patterns are compared with the current high-volume traffic. A deviation from the normal or "allowed" profile can be indicative of a flooding attack.

In pattern detection, a database of attack characteristics observed in the past incidents is created. All incoming packets are compared against the signature data contained this database, and those that match are deemed to be DoS attack packets, and are blocked. This is described in Mirkovic at al., 2004, "Internet Denial Of Service: Attack and Defense Mechanisms", Prentice Hall PTR.

Other proposals such as the use of Multi-Level Tree for Online Packet Statistics (MULTOPS) have been made, in which a flood attack can be identified from an uneven packet volume travelling in each direction between two nodes in the network However, such methods of identification of when and which high traffic volumes constitute a DoS attack is however seldom accurate, as much depends on the choice and implementation of parameters and the threshold value to generate the base values (anomaly profiles, attack signatures) against which the current traffic is compared.

Moreover, high traffic levels are not in all cases indicative of a DoS flooding attack. A website may, for whatever reason, become suddenly very popular for legitimate reasons in a short space of time. For example, a previously-little visited site might have been "discovered" and a link to it provided on a popular portal. As another example, a voting site for a popular television programme may be activated—which would attract a "flash crowd", resulting in a spike in legitimate traffic levels to that website.

Furthermore, the known methods are unable to identify with precision the party responsible for the malicious attacks—this is particularly so in DDoS attacks where the sending entities reside within compromised but otherwise-legitimate machines. There is therefore a need to accurately verify whether a high volume of traffic is indeed a DoS flooding attack, due to the draconian response wherein all traffic bound for a victim site is blocked, and also to identify the senders or sending entities transmitting such malicious traffic. Preferably, the solution should be able to identify or confirm the actual senders or sending entities transmitting legitimate packets with malicious intent, as well as where such senders use forged or spoof IP source addresses. The solution should also be bandwidth-efficient so as not to add to the burden which the network is already under during attack conditions.

According to a first aspect of the invention, there is provided a method of identifying traffic within a network representative of an abnormal network condition, including
    monitoring a communications link for a high traffic volume level,
    identifying a domain being the source of the high traffic volume level,
    identifying within the domain, a sending entity transmitting traffic from the domain,
    using a detector located at or proximate to the domain to invoke a response from the sending entity,
wherein a failure by the sending entity to provide an expected response to the message in accordance with a network protocol indicates that the traffic transmitted by the sending entity is traffic representative of an abnormal network condition.

In preferred embodiments, this method can be used to provide a confirmation that a particular high traffic volume level is (part of) a DoS attack, as opposed to a legitimate traffic level spike caused by e.g. flash crowding. The method can also be used or test and diagnostic purpose, to identify a operational fault within the network, and/or of the sender's equipment which causes the failure of the sender to respond in the expected or conventional manner according to the rules of certain rules or protocols such as TCP or ICMP. The method also serves to identify or confirm the sender of the traffic giving rise to the abnormal network condition, which could be a sending entity such as a zombie or a bot residing in a machine which is otherwise being used legitimately.

The detector is preferably located proximate to the sender, e.g. within the domain of the suspected party, more preferably within the same subnet. This increases the speed and precision of the identification and detection process. The process is initiated by the detection of a high traffic volume within the network e.g. at a particular communications link or point, especially where the traffic is sent at a high transmission rate. This initial detection of high traffic levels can be carried out using known detection techniques e.g. by monitoring traffic patterns within the network, etc. Upon detection of the existence of such a situation, the headers of the packets transmitted by the sender can be examined e.g. by routers and/or by the detector, to discover their domain of origin.

The detector is any apparatus or device configured chiefly to act upon the identification of suspicious activity or senders, by acting on behalf of the party to whom the suspicious traffic is addressed. The sending party however, is kept unaware that it is now dealing with the detector and not with the victim. In various embodiments, the detector sends to the sender TCP requests for re-transmission of previously-sent packets, or else withholds or delays the delivery of the victim's acknowledgement (ACK) packets after the sender's packets have been delivered. In yet another embodiment, the detector sends a choke message e.g. in the form of a ICMP Source Quench request. A sender with malicious intent or one operating under faulty conditions, will not respond according to the TCP or the ICMP—this failure can be taken as an indication of an abnormality within the network requiring attention.

Essentially, a situation or conditions are created by the detector which seem routine and unremarkable to the sender, so the sender's suspicions will not be aroused. No significant modification to existing systems is required for the operation of the invention. Following this identification of a network abnormality and/or the identity of the party associated with the abnormality, certain further steps can be taken, e.g. the traffic originating from the sender failing to respond as expect can be blocked or the bandwidth allowed to such traffic reduced.

The method of the invention can be used in a variety of contexts. It could serve to detect suspicious traffic in the first instance. Alternatively, it could be used to confirm that traffic already suspected to be (part of) a DoS attack is indeed malicious in nature, where the sender and/or traffic has already been identified by an network administrator, or else by anomaly- and/or attack-signature or pattern detection methods (as discussed in more detail below).

According to a second aspect of the invention, there is provided a method of identifying a party associated with traffic within a network representative of an abnormal network condition, including the method of identifying traffic within a network representative of an abnormal network condition as claimed, wherein the sending entity who fails to provide the expected response is a party associated with the traffic of an abnormal network condition.

Identification of the abnormal network condition simultaneously identifies the party responsible for, or connected with, the traffic causing the network abnormality.

In further aspects of the invention, there are provided apparatus for identifying traffic representative of an abnormal network condition, and for identifying a party associated with traffic within a network representative of an abnormal network condition as claimed.

In yet further aspects of the invention, there is provided an installation comprising a telecommunications network, further including apparatus according to the claims, and a method of operating the claimed apparatus.

Exemplary embodiments of the invention will now be described by way of example only with reference to the accompanying drawings in which:

FIG. 1 illustrating a typical network setup for a DDoS attack;

While the description herein will refer to "malicious" attacks by senders as consisting of a DoS attack wherein the sender acts with malicious intent to cripple the intended receiver's system by flooding it, the disruptive effects of flooding are felt even where there is no malicious intent on the part of the sender, for example if the sender's equipment or software is faulty, or where in any event the sender unintentionally sends a large volume of useless data to an addressed receiver. The present description of the invention is directed to the effects of a flooding of a network, and a party's computational and network resources within the network, as an objective effect, regardless of the subjective intent behind the flooding, although for convenience the invention shall herein be described in terms of a "malicious" sender sending "malicious" traffic to "attack" a "victim".

Figure 1:
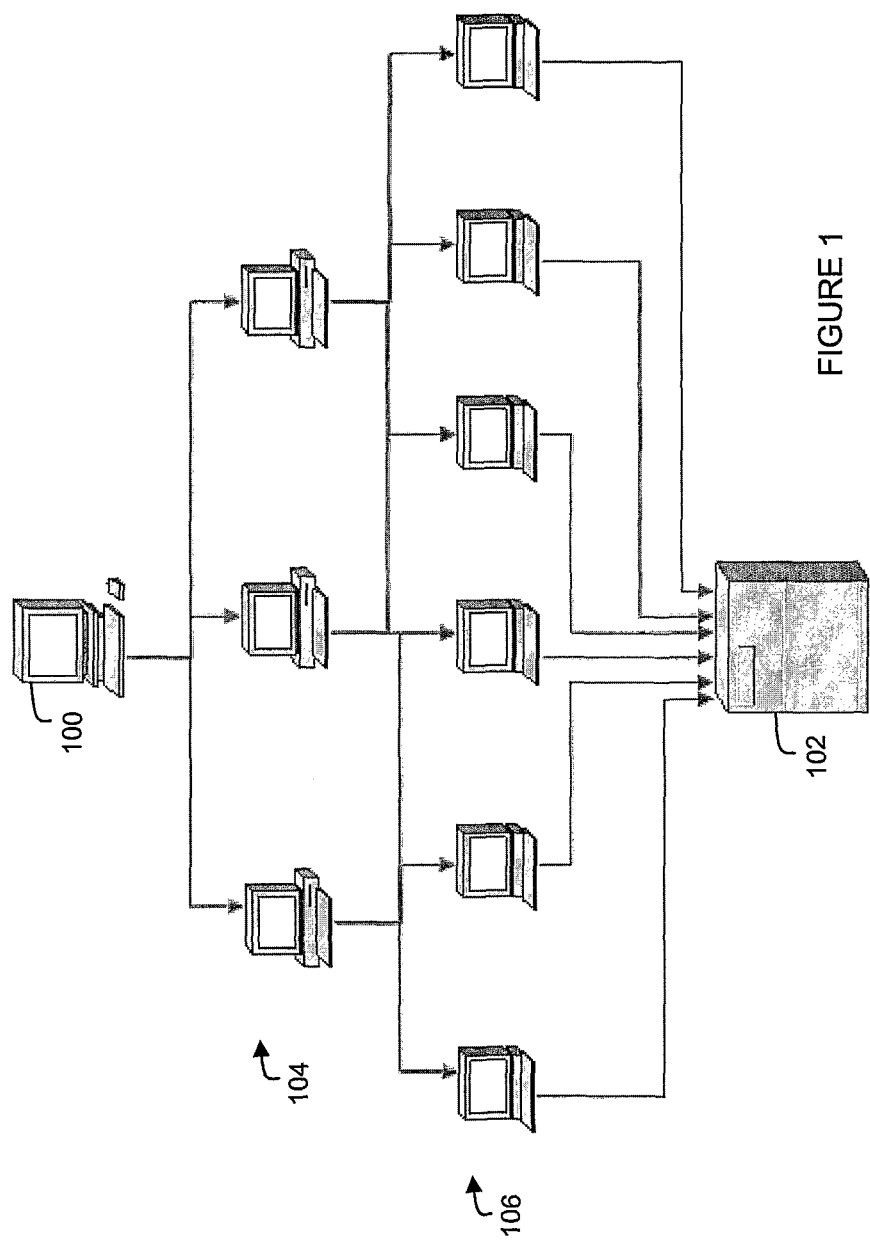

FIG. 1 is a schematic overview of a classic DDoS attack setup. An attacking machine (100) (being one which is operated to send traffic with malicious intent) targets a victim machine (102) via a number of handlers (104) and agents (106), which could take the form of zombies, bots or the like. The attacker typically controls the handlers which in turn control the agents to generate the DDoS attack. In this way, a vast number of agents could be deployed to flood the victim with the malicious traffic.

Figure 2:
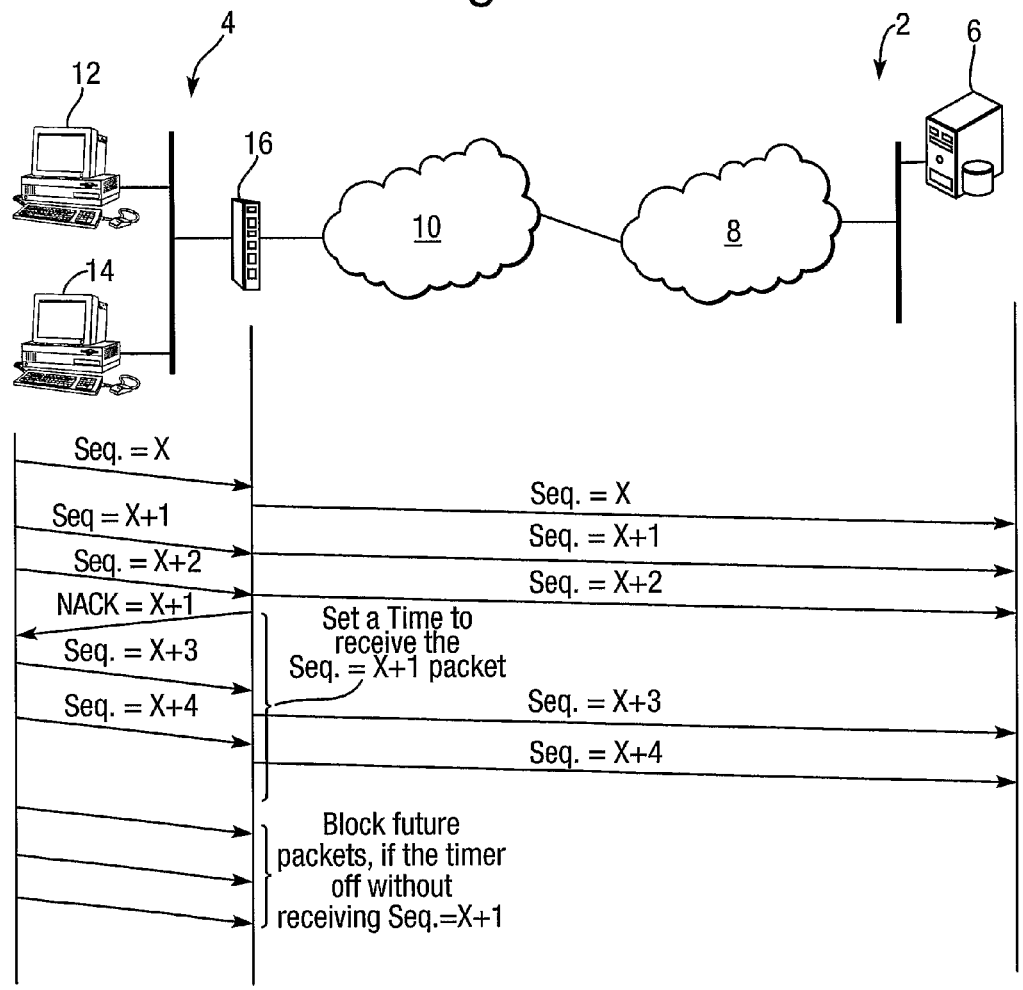
FIG. 2 depicts a network arrangement and a sequence diagram depicting a first TCP implementation of the invention.

FIG. 2 depicts the components making up a conventional Internet-based network system comprising a number of domains, although the invention can work equally well within a single domain, intranet or extranet, within which the sender and the victim are both located. On the receiver side (2) is a receiving node (6) (herein also called "receiver", "receiving computer", "victim", "target" or the like) located within a first, receiver's domain (8) (sometimes referred to herein as the "victim's domain"). This is connected via a network like the Internet to a second, attacker's or sender's domain (10) on the sender side (4), within which senders (12) and (14) are located.

In a typical DoS attack, a sender (e.g. 14) (herein also the "attacker", as the context permits) sends to the targeted receiver (6) a large number of messages comprising e.g. connection requests, through the two domains forming the network interconnecting them. These messages can be sent directly, or via the handlers and agents illustrated in FIG. 1. The traffic is sent with the malicious intention of starving the receiver of computer resources, or else to congest the communications link or path to the receiver so as to impede third party access to the receiver's servers.

In the invention, the network of FIG. 2 includes a detection apparatus or system (16) which is preferably located at the sender end (2) within the sender's domain (10), for reasons which will be discussed below. The function of the detection apparatus can be performed by a router of the domain or of the subnet within from which the suspicious packets are originating. As traffic is generated by the senders, the sender's domain (10) is configured so that traffic passes through the detection system(s). There is at least one detection system per domain, and preferably there are should be a detection system for a pre-determined number of sender hosts (e.g. one detection system for every 1,000 hosts, or one per subnetwork in the domain), depending on traffic levels, link speeds, and so on.

The primary function of the detection system is to identify malicious traffic and the parties responsible or associated with such malicious traffic. This it does by testing sender(s) who are sending traffic to the victim from within the attacker's domain. The test can be applied to all senders served by the detection system, or more productively, only on those senders who are generating and sending a high volume of traffic through the domain on the sender side. In a preferred embodiment, this test can be conducted on a sender who has already been initially identified as possible attacker, by an alert from the ISP of the receiver's domain, or through initial identification using the anomaly- or signature-detection or other methods discussed above. The detection system can be activated manually by the ISP, or automatically upon the satisfaction of pre-determined conditions e.g. when internal traffic volumes within the sender's domain or subnetwork within the domain unexpectedly rise above a certain threshold, prompting an investigation to discover its cause.

The detection system is ideally set at the backbone of the network where most of the traffic to or from the internal clients passes through. In a preferred implementation, the system takes the form of a software program configured to be executed on a gateway or backbone router of the domain (or subnetwork thereof) located so that it can issue its invocation challenge at the boundary of the internal network. By way of an example, a backbone router such as the Cisco™ 12000 series which can forward traffic at speeds from 40 to 60 Gbps, can be suitably configured for this purpose.

Alternatively, the challenge or detection system can take the form of hardware located again preferably at or near the domain or subnet boundary, but physically separate to the router or gateway apparatus. Such a separate detection system apparatus might be connected to a higher-speed backbone router in manner so that operation of the detection system apparatus is triggered only upon the detection of a high volume of traffic by the router. The detection system apparatus could in this arrangement issue challenges to only those parties identified to be sending the high volume of traffic. Thus the detection system need not itself have to be expensively adapted to cope with high speed traffic processing.

The test or challenge itself can take a variety of forms. In all cases, the suspected sender will be prompted to provide a response to the test, wherein the expected response should be provided in accordance with a transmission or routing protocol such as TCP or ICMP. The test or invocation itself takes a form which is again conventional in normal transmission operations, and which would not alert the suspected sender that it is tested, in contrast to e.g. methods where the sender is required to verify itself before being allowed to continue transmitting. These methods add to traffic levels in a system which is already under strain, and in any case can be bypassed by the sender without much effort.

Three examples will now be described, the first two being implementations using the TCP and the third using the UDP.

TCP Implementations

Figure 3:
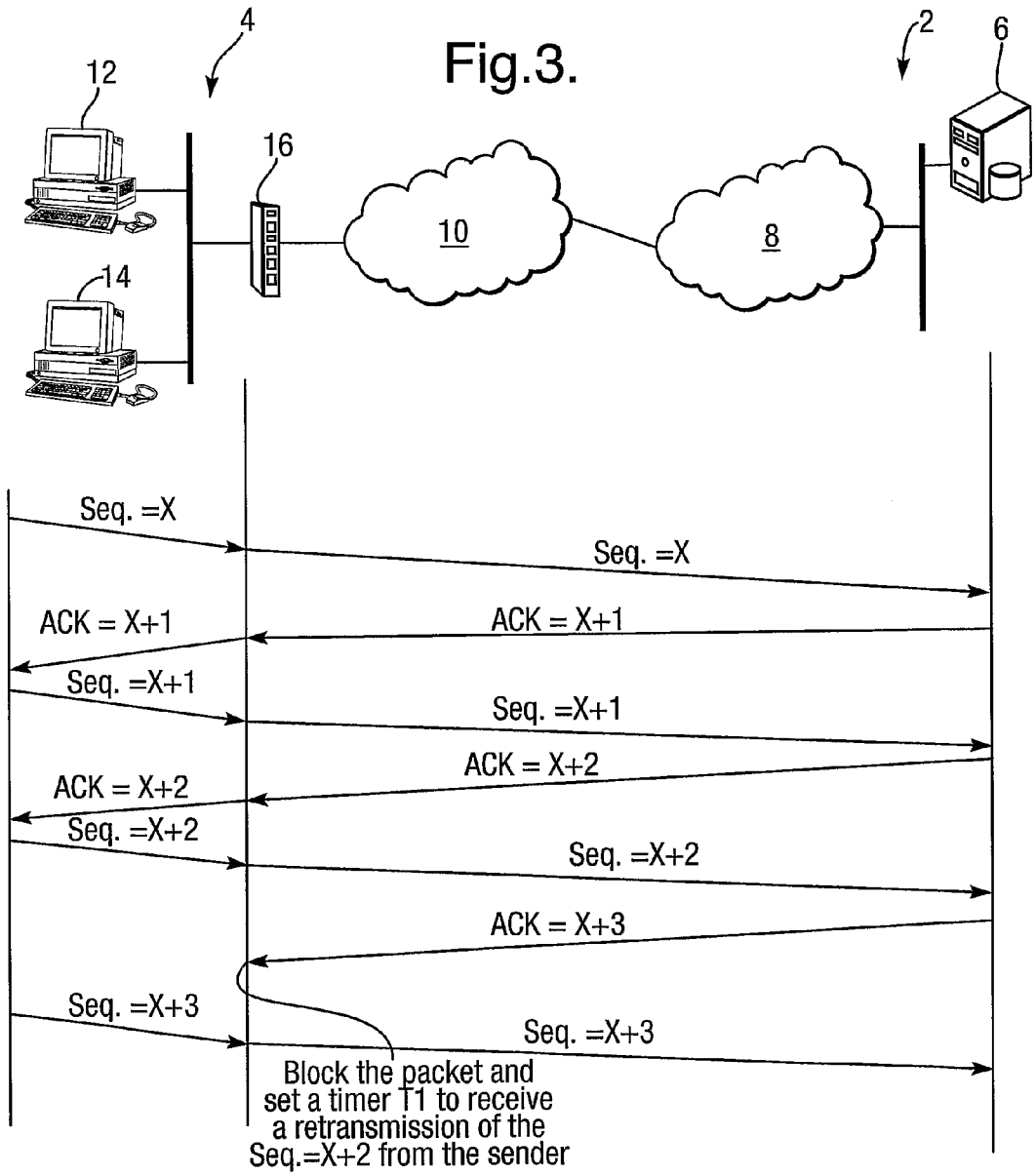
FIG. 3 depicts the network arrangement and a sequence diagram depicting a second TCP implementation of the invention.
Figure 5:
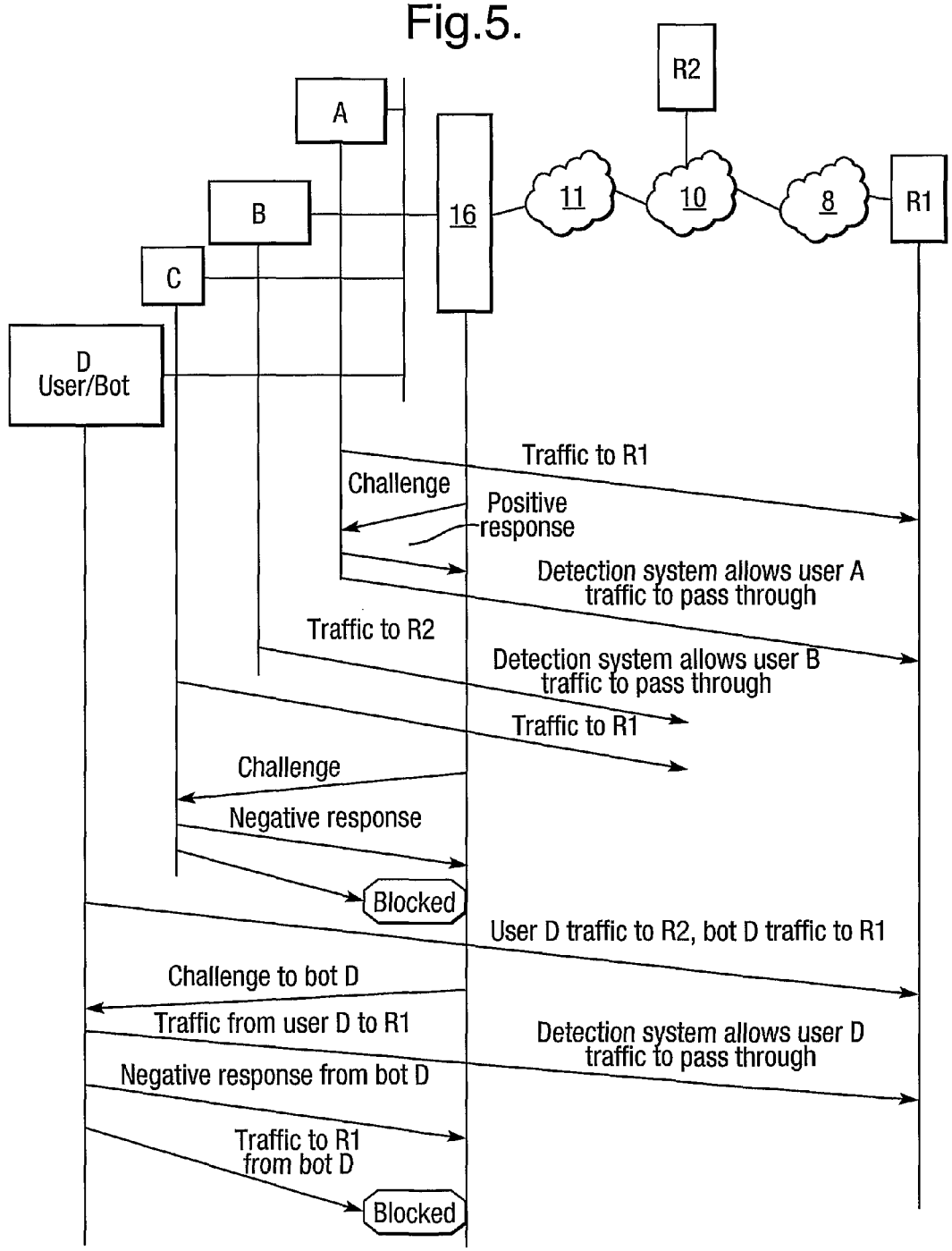
FIG. 5 depicts a network arrangement with four different senders located within the domain of a computer transmitting a high level of traffic indicative of a problem, and a sequence diagram depicting the first TCP implementation of the invention.

These implementations are shown in the sequence diagrams of FIGS. 2, 3 and 5. The test applied by the detection system comprises using TCP rules to invoke a response from the sender. According to the protocol, the sender should respond in a particular way. If the sender fails to provide the normal or conventional TCP response, the tested traffic sent by that party is deemed to be problematic e.g. it is part of a DoS flooding attack, or else there is a operational fault or other problem with the sender's equipment or its part of the network.

In an attack, a malicious sender launches a flood attack by sending a high volume of packets with a high transmission rate. Under the TCP congestion control rules, the recipient sends a request to the sender to lower their traffic transmission rate in the event of congestion. This is usually accompanied by a request that the packets already sent be re-transmitted. Legitimate senders wish for the payload in the data packets they send to be received by the receiver in correct sequence, and so they will comply with request in compliance with the TCP standards. Malicious flooding attackers on the other hand, are not concerned with the content of the messages they send, nor the order in which they arrive; indeed a one typical flooding attack method consists of resending the same one packet with the same one serial number, or packets having random or arbitrary numbers. Unlike in e.g. a virus attack, all that is needed to successfully flood-attack a victim is for a sufficient number of packets to reach the victim at speed to starve it of resources: the content of the packets is completely irrelevant. Thus it is not the attacker's concern that the payload in the packets correctly reaches the receiver.

To ignore TCP requests to reduce its transmission rate and for retransmission, the packets making up the flood traffic are deliberately reconfigured, or not fully implemented, to avoid compliance with the TCP requirements, at least in this respect. Bots, being very simple and specialised small programs, are particularly suited for the purpose of transmitting such flooding packets which full TCP stack is not fully implemented, or else implemented so that the congestion control process controlling the flooding behaviour of TCP can be ignored. Alternatively the sender can use a machine which operating system has been re-programmed or altered—open source systems for example, allow for full reconfiguration and can be misused by attackers. Even non-open source operating systems could be imaginatively reprogrammed for this purpose.

As noted above however, the failure to respond according to the TCP need not invariably mean that the sender is a DoS attacker with malicious intent. It is possible that the sender's machine is malfunctioning or the part of the network the sender is faulty, so that the test message does not reach the sender (although it is still able to send traffic out). In such cases where a DoS attack is not intended by the sender, the invention allows the test and diagnosis of such abnormal conditions in the network—which could be anything from a single faulty machine (or part thereof), to a network-wide problem—for any necessary remedial action. Meanwhile, the high volumes of traffic put out by the faulty sender can nonetheless be blocked to ameliorate the objective effects of congestion over the network or a particular communications link and resource deprivation at the receiver side.

Once the guilty sending entity (or entities) is identified, traffic directed to the victim originating from it is blocked. Thus the activities of other genuine users located in the sender's domain are not disrupted, even if they are at the time communicating, or attempting to communicate, with the victim. The invention allows for very accurate identification of malicious senders, malicious sending entities and malicious traffic, such that even when genuine and attacking traffic is transmitted from the same physical machine (e.g. where a user's computer is infected with a bot), only the attacking traffic sent by the sending entity can be identified and blocked.

The task of blocking traffic can be carried out by a router or a computer as is conventional, or it can be performed by the detection system. Essentially, a timer is set to start a period, and traffic received from the sender identified to be an attacker is simply dropped for the set period by not forwarding it to the next router along. Alternatively, the router or detection system can send a filtering message to the router nearest to the attacking sender, with the instruction for that router to drop traffic for the set period. The filtering message includes the sender IP address, the destination IP address, protocol (TCP) and amount of time to block his traffic. This allows for very specific targeting of malicious traffic: if the sender sending the malicious traffic is communicating with a receiver other than the victim, the legitimate traffic is not blocked or dropped, as the detection system has not found the traffic sent to the other receiver to be malicious.

The detection system is, in a preferred embodiment, located at the sender's end (4) within the sender's domain (10) e.g. at or near a router or gateway of that domain or sub-domain. This is so that the effect of further attacking traffic, after identification by the detection system can be confined within the attacker's domain. Also, there is a greater chance that the challenge or test message sent by the detection system to the sender will reach the sender than if the test message was sent from a more remote location due to the usual reasons such as congestion on the link (due perhaps to the presence of flooding traffic on the link or in the network), or firewalls or domain borders preventing passage of the messages. The skilled person would however appreciate that the detection system can nonetheless be placed at any point between the suspected attacker and the victim, as long as the challenge or test packets can be sent to the sender and its behaviour and response (or lack thereof) monitored. For this reason, it is possible but likely to be inefficient to locate the detection system at or near the victim, given the congested conditions in that part of the network at the time of the test or invocation.

Two TCP examples of how traffic can be tested by the detection system will now be described. In the first, the detection system sends a negative acknowledgement (NACK) message to the sender, and in the second, packets originating from the sender, or ACK messages from the receiver are intercepted so that their delivery is withheld or delayed. In both cases, the conventional TCP response should be to retransmit the packet(s) and drop his transmitting rate complying with the congestion control of TCP.

First TCP Embodiment: NACK Messages

According to TCP protocol, a receiver knows, from the sequence numbers of packets it receives, what it should be receiving next. If an expected packet fails to arrive, the receiver can send to the sender a NACK message to request retransmission of a missing packet. Conventionally, the sender will understand the NACK message to be an indication of e.g. network congestion and that the expected packet is probably lost. The expected response to the receipt of a NACK message is to drop the transmission window size to reduce congestion, and to re-transmit the missing packet.

In the invention, the detection system (16) tests if a suspicious sender is an attacker or not, by invoking the above expected TCP response from the sender. The sequence diagram of FIG. 2 shows an exchange between the detection system and the sender (e.g. 14) wherein the sender is sent a NACK message in which the detection system requests the sender to retransmit a particular packet and drop his transmitting rate. If the sender is genuine and has the legitimate desire to have that packet correctly delivered, it will retransmit the packet and reduce its congestion window size, as is the conventional and expected. If the sender does not—or cannot—care about delivery of the payload of the packet, it will ignore the NACK messages and continuing transmitting the flood traffic at the same rate. The failure by the sender to provide the expected TCP response is noted by the detection system, as confirmation that the sender is indeed an attacker, or else that there is a problem or other abnormality which merits further investigation.

Each NACK packet needs to look as if it came from the intended receiver: under the TCP, such packets must originate from the addressee of the packet. Otherwise, the the packet will be dropped and the challenge session will fail. Thus the detection system generates the test NACK messages using the addressee's details, where source IP address=receiver (6) address, destination address=local client (14) address, source and destination port=similar to original packets traversing between the sender and receiver. The ACK number should be the requested packet to be transmitted: this can be any number observed from previous packets as the NACK serves merely to just to challenge the client to resend that packet with the same ACK header number; the rest of the packet header is irrelevant for present purposes. When the sender receives the request of transmitting the packet, it should retransmit that packet and drop its transmitting rate by dropping the TCP congestion window size according to the TCP protocol.

In the sequence diagram, the sender (14) sends, in succession, packets X, X+1 and X+2 addressed to the receiver (6). These packets reach the detection system (16) which lets them pass through to the receiver machine. Before the next packet is allowed through, the detection system sends a NACK message to the sender. A time is set for the sender to provide the normal TCP response which is to retransmit the packet X+1 identified in the NACK message. The sender ignores the NACK request to retransmit, and instead continues sending the victim packets X+3 and X+4 which the detection system lets through. However upon expiry of the time allowed for the sender to respond by retransmitting packet X+1 required in the NACK message, the detection system determines that the sender is not sending traffic for a legitimate purpose, and blocks further transmissions by the sender.

Second TCP Embodiment: Withholding or Delaying Delivery

In a second TCP example, the detection system withholds or delays delivery of the traffic sent by the suspected attacker. The TCP includes a timeout and retransmission mechanisms. TCP rules provide that the destination to send an acknowledgment (ACK) message back to the sender whenever it successfully receives new segments or packets. Conventionally, a TCP timer is set every time a message is sent, and the ACK message is expected to be received by the sender before expiry of the set time period. If the set time expires without receipt of the ACK, it is assumed that the segment was lost or corrupted, and the sender should retransmit the same (presumed missing) packet. It is not necessary however for ACK for each segment to be received before start the next packet is sent; whole segments in the TCP window can be sent before ACK therefor is expected.

In this implementation, the detection system is configured to intercept either the ACK packets sent by the receiver to the sender, or the packets or segments being sent to the receiver. This enables the detection system to either completely withhold delivery, or else to introduce a delay sufficient so that the time set by the TCP timer expires before the ACK reaches the sender. As a result, the sender fails to receive an ACK for the packet or segment sent. The conventional or normal TCP response to this is to retransmit the particular packet or segment, and drop its transmission rate to comply with the congestion control mechanism of TCP. A sender transmitting genuine traffic will provide the conventional response, as it wants its traffic to get to the receiver correctly. A DoS attacker however is not concerned about delivery of the payload of his messages, and would ignore the lack of receipt of an ACK packet. Instead, it will continue to send flooding traffic the victim.

This failure of the sender to provide the expected TCP response in the circumstances is a positive identification that the sender's traffic is malicious (or symptomatic of a problem), and can trigger a block of the attacking traffic. The time the detection system has to wait depends on the bandwidth delay and sender TCP window size.

This implementation is depicted in the sequence diagram of FIG. 3. The network configuration is identical to that depicted in the NACK embodiment described in FIG. 2, where sending machines (12, 14) are located at the sending end (4) in the sender's domain (10). These sender(s) output messages bound for the receiver computer (6) located at the receiver end (2) in the receiver's domain (8), which are delivered through the network comprising the two domains (8, 10) which includes the detection system (16).

In the sequence diagram of FIG. 3, the sender (14) sends a packet X which is delivered to the receiver (6) via the network. In response, the receiver returns to the sender acknowledgement packet ACK X+1 which the sender receives. The sequence repeats the sending of packet X+2 which returns the ACK message X+2. The sender sends its third message X+2 which again reaches its destination which, in compliance with TCP rules, sends ACK X+3. This time the detection system is activated to test the sender to in respect of its traffic directed to the receiver (6). ACK X+3 is blocked for time period T1 invoke the conventional TCP response from the sender to retransmit packet X+2 and drop its transmitting rate. In the example shown in FIG. 2, the sender fails to provide the correct response, and instead transmits packet X+3 instead of X+2 and keep sending traffic at the same rate. This is an indication to the detection system that the tested traffic is either sent maliciously as flooding traffic, or else that there is a problem or fault within the network at the sender's end so that the sender is unable to respond according to TCP protocol. The sender's traffic can then be blocked by the detection system or other blocking means for a pre-determined period. Other action such as further test and diagnosis or remedial action can also be taken upon such identification of the traffic and the sending entity(s).

UDP/ICMP Implementations

UDP is a connectionless protocol requiring no connection setup procedure for data transfer, and is thus particularly susceptible to use in DDoS flooding attacks. The weakness in UDP that is exploited is the inherent unreliability of the transmission.

ICMP is a protocol used by hosts and routers implementing IP to send failure messages back to a sending system when a semi-permanent delivery problem is detected.

According to this exemplary implementation, the invocation by the detection system is a ICMP Source Quench (SQ) message sent to the suspected sender. The ICMP SQ message is a choke packet, sent to throttle parties such as a router or host, which are sending too much traffic. This essentially takes the form of a request to decrease the traffic rate of messages. A typical use of this message is in the situation where messages are arriving too quickly to be processed, or else where the recipient has run out, or is running out, of buffer space to process further traffic. According to the UDP, all ICMP messages, including SQ messages, are passed from the IP layer to the application layer.

Generally, routers or gateways may discard packets if it has no capacity to deal with them. The router may send an ICMP SQ message to the sender for each discarded packet. A sender receiving a SQ message is expected to respond by slowing down its transmission rate, until such time when it stops receiving the SQ messages. An attacking party will however ignore these messages and keep directing packets to the victim.

In this implementation, the suspected party is sent an ICMP SQ message after the party has been identified. A timer is set to check the sender's response to the choke packet; if there is no change to the transmission rate, this is an indication that the sender is sending abnormal traffic. Although the SQ message may be sent by the victim machine itself, the message is unlikely to be delivered due to the congestion it is suffering at its end. As such, the detection system (16) shown in FIG. 3 (which depiction is identical to that of the TCP implementations discussed against FIGS. 2 and 3) is arranged transmit these packets on behalf of the victim.

Again, the test or invocation message has to look as if it was sent by the recipient, as it would be otherwise simply ignored by the sender. The UDP header information would therefore take the form of: Source IP=Receiver (6); Destination IP=Attacker (12); and the ICMP SQ packet payload would include the first 64 bits of the UDP payload of the suspected attacking message to request a drop in the packet transmission rate.

Upon the expiry of the allocated time, if the sender has failed to cut back the traffic rate as requested, it can then be identified to be a malicious attacker. The traffic can then be blocked or rate-limited in the conventional way, and/or any other test or remedial steps taken as required.

Figure 4:
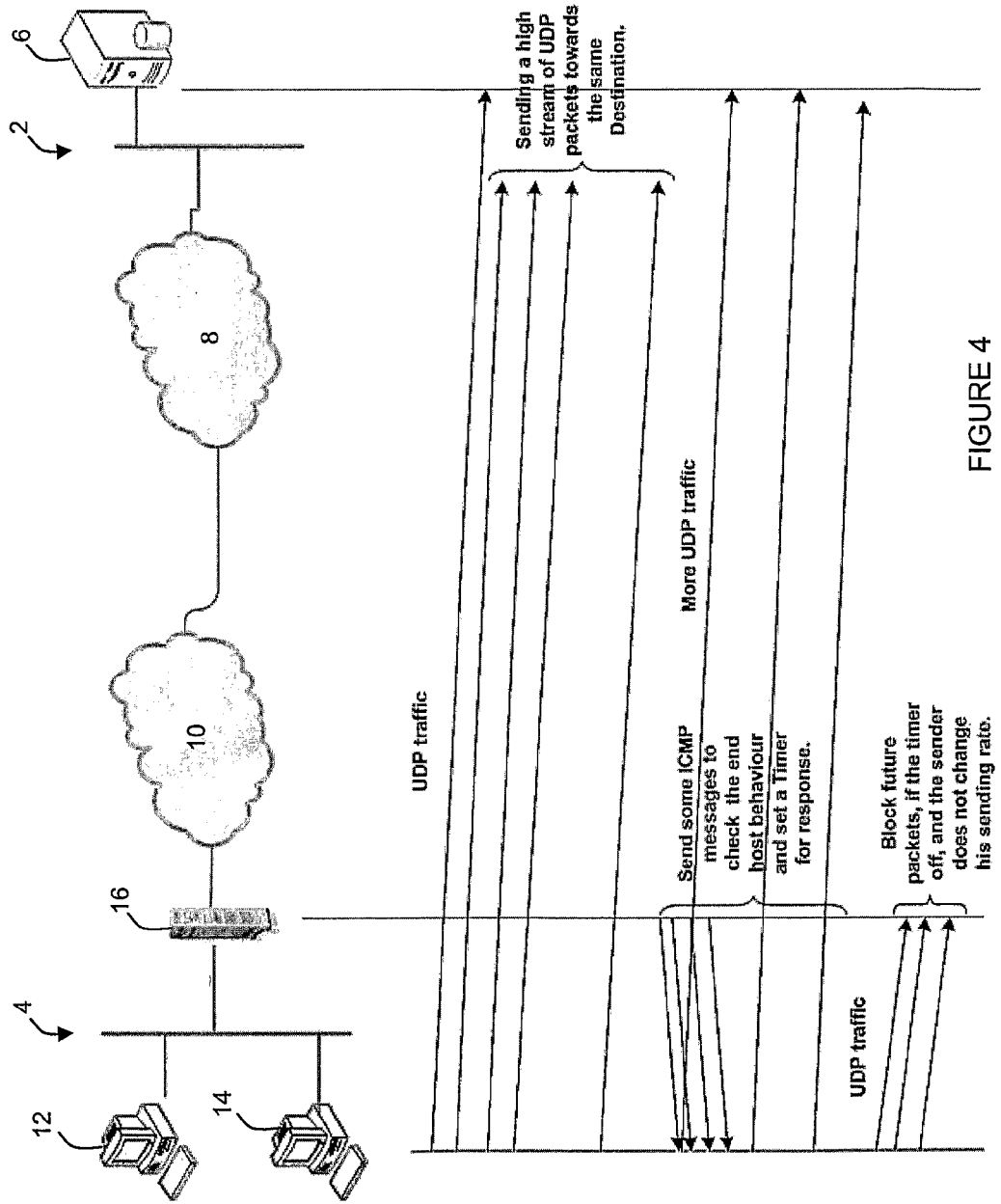
FIG. 4 depicts the network arrangement and a sequence diagram depicting a UDP/ICMP implementation of the invention.

Referring now to the sequence diagram of FIG. 4, the detection system generates a challenge by sending ICMP messages to the sender, after the high volumes of traffic sent by the sender has been detected. A timer is set for the sender's response. If the sender fails to provide the expected response by reducing the transmission rate by timeout, the detection system blocks off the transmission of further traffic.

Because the ICMP is implemented at the transport layer, a ICMP SQ message can be used as to control congestion of traffic sent under any protocol implemented at the higher transport layer. Accordingly, the skilled person would realise that such an ICMP message can be used within the scope of the invention on TCP communications as well.

Multiple Senders and Receivers

A further example illustrating the operation of the inventive method and apparatus will now be discussed using the depiction in FIG. 5 of a network comprising three domains (8, 10, 11), two receivers R1 and R2, and four senders A, B, C and D. This illustration is based on TCP communications, but is as applicable to a UDP transmission in accordance with the description against FIG. 4 above. A detection system (16) is located in the network in the sender's domain (11). Sender A is a genuine user who is seeking to communicate with receiver R1. Sender B is a genuine user who is seeking to communicate with receiver R2. Sender C is a malicious attacker wishing to launch a DoS attack on receiver R1. In the case of sender D, the computer is used by user D for a genuine purpose to communicate with receiver R2, but is also infected with a bot D which is sending flooding packets to receiver R1.

The operation of the invention in each sender's case will now be discussed in turn, with reference to the sequence diagram of FIG. 3. The assumption here is that DoS attacking traffic has been reported by the ISP in receiver R1's domain (8) to the ISP in the senders' domain (11). In this example, the invocation or challenge message takes the form of a NACK packet in a TCP implementation, although it would be understood that any test message according to the invention can be used.

Referring now to the sequence diagram, sender A sends traffic to R1 which reaches R1 via the networks (11, 10 and 8). When the detection system (16) sends a test or challenge message to A (e.g. by sending a NACK message or delaying/blocking the ACK packets from the receiver), A provides the expected and convention TCP response. This satisfies the detection system that A is sending its traffic to R1 for a legitimate purpose, and allows A's traffic to R1 to pass through. The detection system can preferably be configured to test A's traffic after pre-determined intervals to ensure the continued integrity of the A's traffic and intentions.

Sender B is connected to and exchanging data with receiver R2. As no alert has been raised about a DoS attack on R2, B's traffic is not checked by the detection system.

Sender C is a malicious attacker and sending a flood to receiver R1. Here, the detection system issues a test or challenge which invokes a conventional TCP response. The traffic of sender C is configured to ignore requests for retransmission in their single-minded purpose to starve R1 of resources, and so fails comply with TCP congestion control. The detection system interprets this to be an indication that C is either unwilling, or unable, to comply and block's C's traffic. It is a significant advantage of using the present invention that so far, only C's traffic to R1 is blocked; sender A's connection to the same receiver R1 is unaffected, as it has passed the test set by the detection system. This can be contrasted with the cruder methodology of the prior art, wherein all connections to R1 by sender hosts within a domain identified to be the source of flooding traffic, would have been dropped by the ISP as a response of an accusation of originating DoS attack traffic.

Similarly, if the traffic sent by C were transmitted using the UDP, the challenge message sent by the detection system would take the form of an ICMP SQ packet, e.g. for each packet which is discarded by the router or gateway. When C fails to respond by throttling back its traffic transmission rate, this would positively indicate that C is either a DoS attacker, or else that it is suffering a problem.

To illustrate the accuracy and specificity of the results attainable by using the present invention, sender D comprises a user D and a bot D. The traffic generated and sent by the user D is genuine and passes the test or challenged posed by the detection system. Traffic from bot D however, fails the test by not retransmitting packets which are allegedly missing and drop its transmission rate. Thus bot D is deemed to be a malicious sender and its traffic blocked. Meanwhile user D continues innocently and legitimately sending messages to R1, even though he is using the same one machine D from which flooding traffic is transmitted. Thus malicious (or faulty) traffic (rather than a malicious or faulty sender) can be identified and blocked, as such traffic could originate from a machine such as sender D which is not in itself malicious. However it is possible to identify the malicious sender if this is defined to be bot D, so that the system can be instructed to block all traffic originating from the identified malicious sender bot D addressed to the victim.

Thus, only those packets which have been generated by an application or bots configured to deliberately fail to comply with TCP protocols and congestion control mechanisms are caught by the method and apparatus of the invention—the only exception is traffic suffering from abnormal network conditions which prevent the sender from providing a conventional TCP response. Significantly, this method will also work to identify and block malicious senders with fake or spoof identities. This is because the NACK packet or failure to ACK will be sent to the party whose identity is (mis) identified—the senders with fake identities will not receive the challenging messages so he will not be able to respond to them.

In the case where the bot D is transmitting UDP packets, a challenge message sent by the detection system in the form of an ICMP SQ message will be ignored so that the UDP packets continue to be sent at an unchanged rate. This is a positive indication of an abnormal situation involving the bot D. The sender D could be sending TCP or UDP traffic at the same time—a challenge could be issued in the form of a NACK packet or an ACK delay/withholding, or a SQ message as appropriate. As being a legitimate party, sender D will throttle back its sending rate as is expected, and will re-sending packets previously sent in the case of the TCP challenge. Both the abnormal traffic and the party responsible for the same can therefore be very precisely identified—even where the abnormal and normal traffic seemingly originates from the same source.

The invention can also be used to identify spoof attackers and their traffic where attacking packets are sent each having a different IP addresses. In this case, the system of the invention could include a filter or a pattern matcher to identify and catch such packets by monitoring e.g. the packet header.

The present invention is simple to implement and deploy as it requires no significant change to the end clients or core network infrastructure. No new packets dedicated to the task of testing or challenging are required; instead, currently-existing messages, methods and apparatus can be used for a different purpose to different and useful effect. In particular, changes to the architecture of the router or switch behaviour are not needed. Any changes that do need to be made can be effected by off-the-shelf products. Significantly, little additional traffic is generated in a situation where the communications links and nodes are already under a burden of congestion.

In the examples discussed above, traffic concerned is transmitted using the TCP and UDP protocols. The skilled person would appreciate that the invention is as applicable to any protocol using congestion control messages to control traffic rates, in situations where the attack comprises sending a large number of messages to the intended victim. Indeed, the method and apparatus of the present invention would work on any protocol that use messages that can be used to delay the sender traffic or lower his sending rate to minimum. The equivalent of NACK or ICMP SQ packets, being congestion control messages (with the associated detection of conventional protocol response or the lack thereof) can be used to test the integrity of the sender.

The skilled person would recognise that a number of variations and alternatives based on the invention are possible to the devices, apparatus, methods, manufacturing methods and materials used. In particular, various configurations and combinations of hardware, software, firmware and special purpose process may be used may be used to implement the invention. It is also possible also to envisage other purposes, aims and environments to which these devices, methods and the like, may be applied. Accordingly, this invention is not limited to the particular set up and applications described herein. In particular, the two embodiments described above are only examples of ways in which malicious or otherwise abnormal behaviour and traffic can be identified according to the invention, i.e. failure to respond according to the required or expected transmission and routing rules and protocols of the Internet or other communications network systems. For instance, the behaviour of a sender and the traffic patterns in a SYN flood attack could itself arouse suspicion because of how the sender ignores the receiver's grant of the sender's connection request.

The invention claimed is:

1. A method of identifying traffic within a network representative of an abnormal network condition, including
    monitoring, via one or more computer processing devices, a communications link for a high traffic volume level,
    identifying a domain being the source of the high traffic volume level,
    identifying within the domain, a sending entity transmitting traffic from the domain,
    using a detector located at or proximate to the domain to invoke a response from the sending entity, wherein
    a failure by the sending entity to provide an expected response to the message in accordance with a network protocol indicates that the traffic transmitted by the sending entity is traffic representative of an abnormal network condition.

2. The method of identifying a party associated with traffic within a network representative of an abnormal network condition, including the method of claim 1, wherein
    the sending entity who fails to provide the expected response is a party associated with the traffic of an abnormal network condition.

3. The method according to claim 1 wherein the high traffic volume is transmitted at a high transmission rate.

4. The method according to claim 1 wherein
    the abnormal network condition is indicative of a denial of service attack by the sending entity.

5. The method according to claim 1 wherein the abnormal network condition is indicative of an operational fault involving the sending entity.

6. The method according to claim 1 further including the step of blocking further traffic transmitted by the sending entity.

7. The method according to claim 1 wherein at least one sending entity is an automated entity.

8. The method according to claim 1 wherein the sending entity transmits Transport Control Protocol (TCP) traffic, and wherein the expected response by the sending entity comprises at least one of either re-transmitting previously-sent traffic, or reducing its transmission rate.

9. The method according to claim 8 wherein the detector sends a negative acknowledgement (NACK) message.

10. The method according to claim 8 wherein the detector blocks or delays onward transmission of a message addressed to the sending entity, which acknowledges receipt of traffic transmitted by the sending entity.

11. The method according to claim 1 wherein the detector sends a choke packet and wherein the expected response by the sending entity comprises reducing its transmission rate.

12. The method according to claim 11 wherein the choke packet comprises an Internet Message Control Protocol (ICMP) Source Quench message.

13. The method according to claim 11 wherein the sending entity transmits User Datagram Protocol (UDP) traffic.

14. The method according to claim 1 wherein the monitoring of the communications link comprises at least one of either detecting anomalies in traffic patterns, or detecting traffic having a pre-defined attack characteristic.

15. An apparatus for identifying traffic representative of an abnormal network condition, including
    a monitor arranged to monitor, via one or more computer processing devices, a communications link for a high traffic volume level,
    a domain identifier arranged to identify a domain being the source of the high traffic volume level,
    a sending entity identifier arranged to identify a sending entity transmitting traffic from the domain,
    a detector arranged to invoke a response from the sending entity, and
    a detector arranged to detect a failure by the sending entity to provide an expected response to the message in accordance with a network protocol, the failure being indicative that the traffic transmitted by the sending entity is traffic representative of an abnormal network condition.

16. The apparatus for identifying a party associated with traffic within a network representative of an abnormal network condition using the apparatus of claim 15, wherein the sending entity who fails to provide the expected response is a party associated with the traffic of an abnormal network condition.

17. The apparatus according to claim 15 further including a blocker arranged to 10 block further traffic transmitted by the sending entity.

18. The apparatus according to claim 15 wherein the detector is located in, at or proximate to the domain.

19. The apparatus according to claim 15 wherein the detector is co-located with a router of the domain.

20. An installation comprising a telecommunications network, further including an apparatus according to claim 15.

21. A method of operating, via one or more computer processing devices, an apparatus according to claim 15.

* * * * *

UNITED STATES PATENT AND TRADEMARK OFFICE
CERTIFICATE OF CORRECTION

PATENT NO. : 8,584,236 B2  Page 1 of 1
APPLICATION NO. : 12/593370
DATED : November 12, 2013
INVENTOR(S) : El-Moussa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this
Twenty-second Day of September, 2015

Michelle K. Lee
*Director of the United States Patent and Trademark Office*